United States Patent

Emmer et al.

[11] Patent Number: 5,920,677
[45] Date of Patent: Jul. 6, 1999

[54] METHOD AND DEVICE FOR SELECTIVELY HEATING A CONTAINER PREFORM

[75] Inventors: Gérard Emmer, Saint Jouin Bruneval; Alain Evrard, Le Havre, both of France

[73] Assignee: Sidel, Octeville-sur-Mer, France

[21] Appl. No.: 08/930,694

[22] PCT Filed: Oct. 10, 1996

[86] PCT No.: PCT/FR96/00538

§ 371 Date: Dec. 16, 1997

§ 102(e) Date: Dec. 16, 1997

[87] PCT Pub. No.: WO96/32243

PCT Pub. Date: Oct. 17, 1996

[30] Foreign Application Priority Data

Apr. 12, 1995 [FR] France ................................ 95 04390

[51] Int. Cl.[6] ............................................. F21V 7/00
[52] U.S. Cl. .................... 392/419; 392/411; 156/272.3; 156/380.9; 425/526
[58] Field of Search ................................ 392/419, 420, 392/421, 408, 411, 412; 156/272.2, 380.9; 264/492, 493, 458; 425/526; 250/515.1, 494.1, 495.1, 503.1, 504 R

[56] References Cited

U.S. PATENT DOCUMENTS 4,923,395  5/1990  Coxhead et al. .

FOREIGN PATENT DOCUMENTS

| 197 780 | 10/1986 | European Pat. Off. . |
| 240 037 | 10/1987 | European Pat. Off. . |
| 63-307928 | 12/1988 | Japan . |
| 2 095 611 | 10/1982 | United Kingdom . |
| WO 92/15442 | 9/1992 | WIPO . |

*Primary Examiner*—Teresa Walberg
*Assistant Examiner*—Vinod D. Patel
*Attorney, Agent, or Firm*—Sughrue, Mion, Zinn, Macpeak & Seas, PLLC

[57] ABSTRACT

A preform (3) for use in making a container such as a bottle from a thermoplastic material is selectively heated prior to at least one step of blow molding or stretch-blow molding the heated preform. For this purpose, at least most (7A) of the radiation (4) transmitted generally towards the preform by a source (1A) is focused (8) onto a preferred area (A) thereof, the source is located substantially opposite the preferred area of the preform, whereby said the preferred area (A) receives most (7A) of the radiation (4) while the areas adjacent to the preferred area (A) do not receive the radiation fraction initially transmitted towards them by the source.

19 Claims, 3 Drawing Sheets

METHOD AND DEVICE FOR SELECTIVELY HEATING A CONTAINER PREFORM

The present invention relates to improvements made to the selective heating of a preform intended for the manufacture of a container, such as a bottle, made of a thermoplastic, in particular made of polyethylene terephthalate PET, polyethylene naphthalate PEN, or alloys or mixtures of such materials, by at least one subsequent step of blow molding or stretch-blow molding of the hot preform.

BACKGROUND OF THE INVENTION

1. Field of the Invention

During the operation of blow molding or stretch-blow molding, certain areas of the preform undergo complex elongations of large amplitude: this is the case of the area which lies immediately below the neck and is which leads to the shoulder of the final container; this is also the case of the bottom area, whatever the shape of the bottom of the final container. It is known, in order to make it easier to stretch the plastic in these areas, locally to soften the material to a greater extent and therefore to heat said preferential areas to a temperature substantially higher than the rest of the preform, while still preventing crystallization of the constituent material of the preform. The problem may furthermore be complicated by the fact that, immediately adjacent to one of these areas to be heated preferentially (for example, the area lying immediately below the neck of the preform and intended to form the shoulder of the final container), may be found an area of the preform which must not be heated or be heated very little in order for it not to be softened and therefore not to undergo deformation during the subsequent steps of blow molding or stretch-blow molding (for example, because the material has already been treated or will be treated subsequently), as is the case, in particular, for the neck of the preform.

Currently, it is known to carry out the heat treatment of the areas which have to be heated preferentially by heating said areas for a longer time and/or more strongly than the rest of the preform. Furthermore, masks are put into place which protect the areas, such as the neck, which must not be heated preferentially.

2. Description of the Related Art

FIG. 1 of the drawings shows highly diagrammatically a conventional arrangement of a tunnel furnace treating the preforms on the run, the linear movement of the preforms being accompanied by a rotation of each preform about itself so that it is exposed approximately uniformly to the radiation from sources which are placed along one side. As shown in FIG. 1, the sources consist of elongate infrared-radiation lamps or tubes 1 placed on top of one another in order to heat the entire body 2 of a preform 3. The effective part of the radiation from each lamp which reaches the preform is denoted by 4, the thermal power received by the preform per unit surface area, for a given emitted power, being greater the shorter the distance from the lamp 1.

The body 2 of the preform 3 has an area A (lying immediately below the neck 5 of the preform) which, having to form the shoulder of the final container and therefore having to undergo significant stretching, must be heated substantially more than the rest of the body. In order to make the heating times for all parts of the body of the preform the same, the distance of each lamp from the area of the preform which has to be heated is regulated and/or adjusted; thus, for example, the area A is heated by reducing the lamp-preform distance; in other words by placing the lamp 1A lying opposite the area A closer to the preform, thereby making it possible to heat this area by decreasing the emitted power. It should be pointed out that this arrangement means that the areas adjacent to the area A themselves run the risk of being heated more extensively if the power is not suitably controlled.

Moreover, in order to attempt to protect the neck 5, which must not be heated, a mask 6 is placed so as to lie substantially level with the junction part between the neck 5 and the body 2 of the preform 3. However, it is found that a fraction 7A (shown by the bold lines) of the radiation 4 emitted by the lamp 1A is not occulted and reaches the neck 5 and that, likewise, a fraction 7B, (also shown by bold lines) of the radiation 4 emitted by the lamp 1B lying above the lamp 1A also reaches the neck 5 (the lamps lying above the lamp 1B are too far away and may be considered as not having an effect on the neck 5). The neck 5 is therefore insufficiently protected and it is thus necessary to limit the power of the lamp 1A, and therefore to limit the additional heating of the area A, in order to avoid heating the neck 5 excessively.

Under these conditions, the current furnace arrangements have the drawback of heating which is insufficiently localized on the areas which have to be heated preferentially, such as the future shoulder, the bottom and possible necking areas. Furthermore, it is difficult, or even impossible, to heat a very narrow area more intensely except by putting into place a local thermal protection system which would excessively complicate the furnace arrangement. With regard to the protection of the areas which must not be heated or must be heated only a little, this can be achieved only by putting into place masks in the form of elongate and profiled plates, the effectiveness of which is not as complete as one would desire.

SUMMARY OF THE INVENTION

The object of the invention is essentially to provide means—a method and a device—which meet the desiderata of simplification of the process of selectively heating the preforms and which enable, in a simple manner, preferential areas to be heated more intensely, with the possibility of adjusting the position and the extent of said areas, with less interference from neighbouring areas, and, moreover, with the possibility of protecting, in a simple manner, a neighbouring area which must not be heated, the means employed in accordance with the invention avoiding recourse to additional masks and resulting in an arrangement of the preform heating furnaces, in particular of tunnel furnaces for heating on the run, which is simpler, with regard to improvement of the ensured functions, and is relatively less expensive.

For these purposes, according to a first of its characteristics, the invention provides a method for selectively heating a preform as mentioned in the preamble, which, in accordance with the invention, is essentially characterized in that at least the greater part of the radiation emitted, approximately in the direction of the preform, by a lamp lying substantially opposite a preferential area of the preform is focused onto said preferential area of the preform.

By virtue of the focusing of the radiation emitted by the lamp, the proportion of the radiation which reaches the desired area of the preform is considerably increased, whereas previously the radiation emitted by the lamp was appreciably diffuse: a substantial fraction of the emitted radiation reached the preform on either side of the desired area. In other words, solely by the fact of focusing the radiation emitted by the lamp, it is possible to achieve more intense heating of a preferential area of the preform, even though the electric power supplied to the lamp remains the same, or is even reduced.

This also results in the neighbouring areas not receiving more or receiving less radiation (lateral radiation or stray radiation) coming from said lamp. It is therefore easier to control their actual heating or indeed their lack of heating if these neighbouring areas, or one of them, must not be heated.

Finally, it becomes easier, without modifying the power and/or position of the lamp, to adjust the position and extent of the area which has to be heated preferentially as well as to set the heating power, very simply by adjusting the position, parallel to the preform and/or transversely to the latter, of the focusing means, or indeed by modifying the focusing coefficient of the latter.

In general, in tunnel furnaces for heating on the run, the heating of the preform is carried out using several superimposed rows of elongate infrared lamps. Because of the nondirectivity of the radiation emitted by each lamp, a given area of the preform may be heated not only mainly by the radiation from the lamp lying approximately opposite said area but also secondarily by the lateral radiation from an adjacent lamp; in the same way, even if the radiation from a lamp is focused onto an area of the preform to be heated preferentially and if an adjacent area is thus preserved from lateral radiation coming from said lamp, said adjacent area which it is desired not to heat may, however, remain exposed to lateral radiation coming from another lamp lying beyond the previous one. Under these conditions, the method of the invention is designed so that at least that part of the radiation emitted by a second lamp neighbouring the aforementioned lamp in the direction of an area to be preserved from the heating in a preferential manner, which is adjacent to the area to be heated preferentially and which lies, with respect to the latter, opposite the abovementioned second lamp, is, furthermore, at least highly attenuated, whereby the area to be heated preferentially receives the focused radiation coming from the first lamp and a fraction of the stray radiation coming from the second lamp, whereas said area to be preserved from the heating in a preferential manner receives neither the radiation from the first lamp which has been focused onto the aforementioned area to be heated preferentially nor the lateral radiation from the second lamp which has been occulted, or then only a highly attenuated portion of the latter radiation. In this context, provision is made to occult essentially that part of the radiation from the aforementioned second lamp emitted approximately in the direction of said area which must not be heated preferentially (i.e. that part of the radiation following the longest path before reaching the preform).

It is then advantageous to arrange for at least the aforementioned part of the stray radiation from the second lamp to be highly attenuated or occulted using the means with which the radiation from the first lamp is focused; in this case, these are the means, already in place, which form the screen, thereby making it possible to save on equipment.

In a preferred application of the method of the invention, part of the body of the preform which is adjacent to the neck of the preform and which is intended to form the shoulder of the future container is heated preferentially and the neck of the preform, which is immediately adjacent to said part to be heated preferentially and opposite which no lamp is placed, is protected from the heating in a preferential manner. It is also advantageous to heat, according to the method of the invention, the bottom of the preform or of possible necking areas.

According to a second of its characteristics, the invention also provides a device for selectively heating a preform, such as the device mentioned in the preamble, which, being designed according to the invention, is essentially characterized in that it furthermore includes focusing means interposed between the lamp and the preform which are designed to receive, and focus onto a preferential area of the preform lying opposite said lamp, at least the greater part of the radiation emitted by the lamp in the direction of the preform. Preferably then, when the device includes a second radiation lamp and when it is necessary to avoid heating a second adjacent area excessively, the focusing means are furthermore placed so as highly to attenuate at least the greater part of the radiation coming from said second lamp directed toward the second area of the preform immediately adjacent to the aforementioned area to be heated preferentially. It is then highly advantageous for the focusing means to be designed to occult the greater part of the said radiation from the second lamp directed toward said second area which is not to be heated preferentially, thereby making it possible to combine the focusing and occulting functions in the same member and therefore saving in equipment, space and money.

Desirably, first movement means are provided for moving the focusing means parallel to the axis of the preforms, whereby it is possible to adjust, on the preform, the area of incidence of the focused radiation, and/or second movement means for moving the focusing means so as to bring them closer to or further from said radiation lamp, whereby it is possible to adjust the intensity of the radiation focused onto the preform.

In practice, the focusing means comprise at least one plano-convex optical element having its convexity turned toward the preform, the axis of the plano-convex element being approximately aligned with the center of the radiation lamp and the center of that area on the preform which is to be heated preferentially. In a heating device designed for heating preforms on the run and in which each radiation lamp is in the form of a strip, the associated plano-convex element perhaps should be a plano-convex optical strip having substantially the same length as the lamp.

In a preferred field of application of the device of the invention, the focusing means are placed so that an area of the body of the preform lying immediately adjacent to the neck of the preform is heated preferentially and so that the neck of the preform is not heated preferentially; for another application, simpler to implement, the focusing means are placed so that the bottom of the preform or a necking area is heated preferentially.

It will also be noted that implementation of the invention makes it possible to avoid recourse to preforms of complex shapes, for example those with extra thicknesses in certain areas of the body.

BRIEF DESCRIPTION OF THE DRAWINGS

The invention will be more clearly understood on reading the detailed description which follows of certain preferred embodiments given solely by way of entirely non limiting examples. In this description, reference is made to the appended drawings in which.

DETAILED DESCRIPTION OF THE INVENTION

Figure 1:
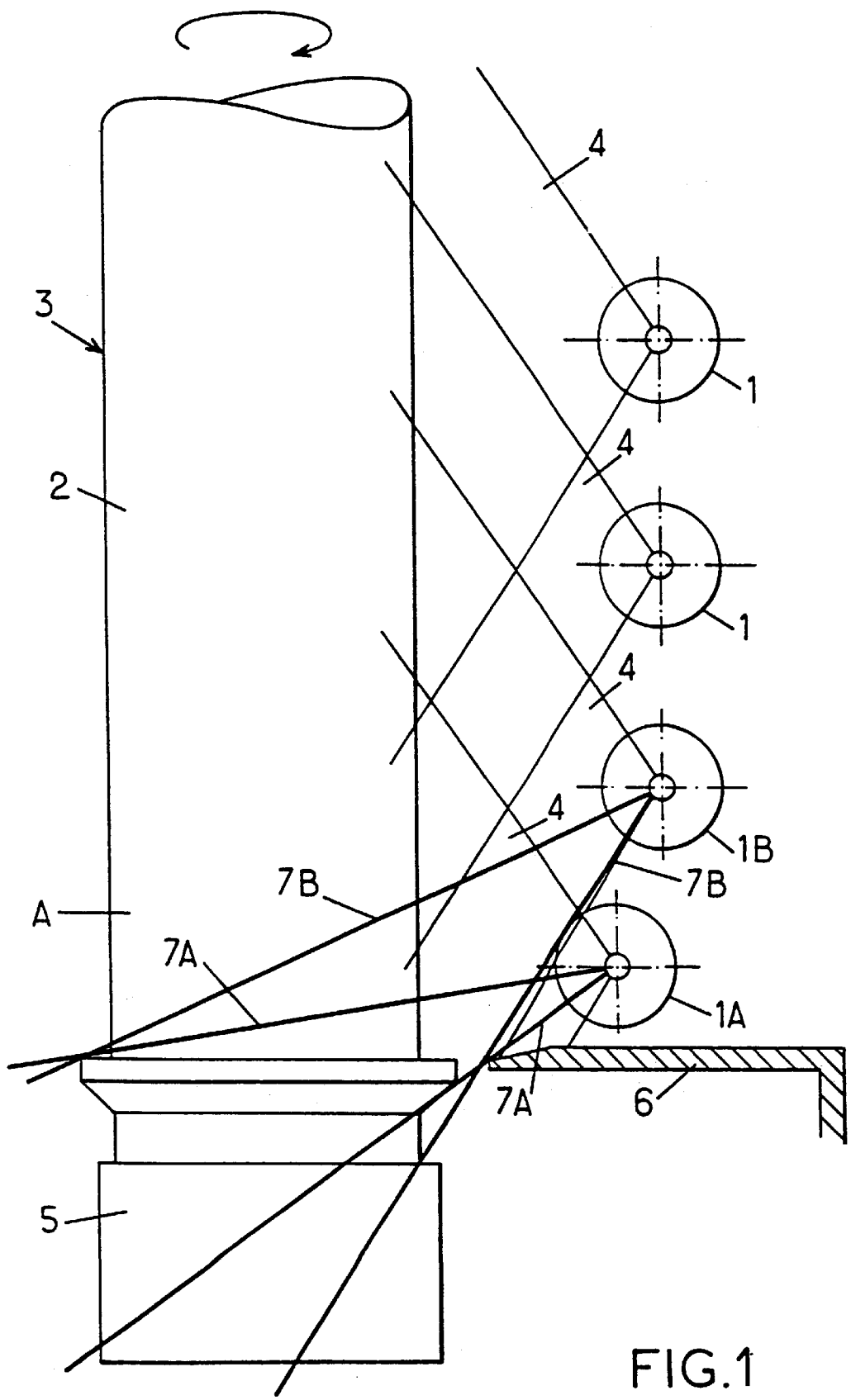
FIG. 1 is a diagram showing, in a simplified manner, a conventional arrangement of a tunnel furnace treating preforms.
Figure 2:
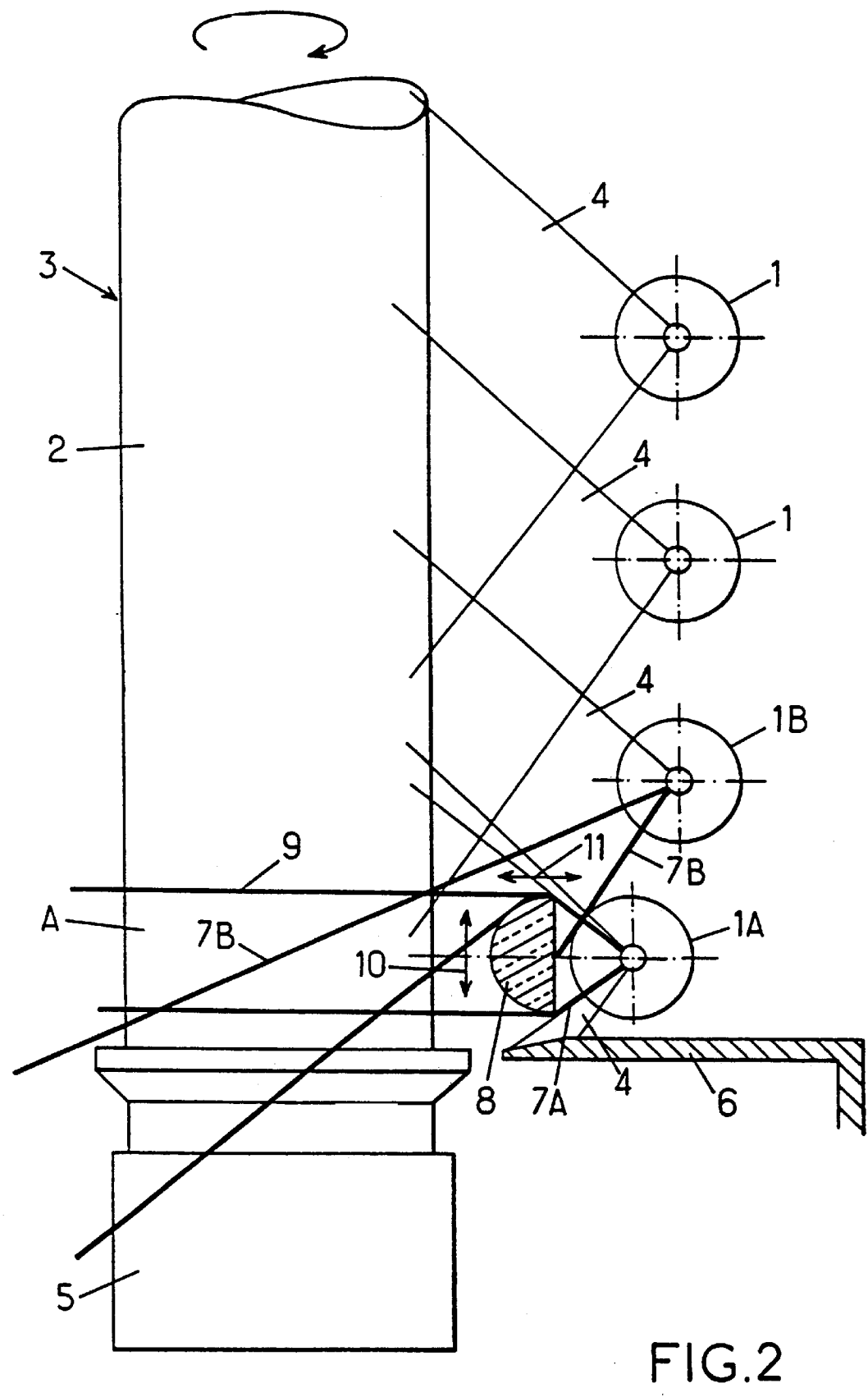
FIG. 2 is a diagram illustrating, in a simplified manner, the method of heating according to the invention.

FIG. 2 shows an arrangement similar to that in FIG. 1, although it is necessary to keep the same arrangement not given the improvements made by the invention, it nevertheless continue to provide appreciable advantages in combination with the devices of the invention which will be dealt with hereinbelow: in particular, the lower lamp 1A lying opposite the area A of the body 2 of the preform which has to be heated preferentially, is substantially offset out of alignment with the other lamps 1 and lies closer to the preform; the mask 6, lying approximately opposite the part separating the neck 5 from the body 2 of the preform 3, has been preserved. Furthermore, the same numerical references as in FIG. 1 have been preserved in FIG. 2 in order to denote similar members or parts.

In accordance with the invention, an optical element 8 designed to focus at least part of the radiation emitted by the lamp 1A is placed between the lamp 1A and the area A of the body 2 which has to be heated preferentially. The focusing element 8 must be made of a material capable of withstanding the ambient temperature within the furnace without deformation and without impairment, and it may have any shape suitable for producing the desired focusing of the infrared radiation. As shown in FIG. 2, the focusing element 8 may be a silica strip of plano-convex cross section.

The dimensions and the optical characteristics of the focusing element 8 are defined so that a major part 7A of the infrared radiation 4 emitted by the lamp 1A in the direction of the preform is focused into a beam 9 (drawn in bold lines) having substantially parallel edges, as shown, or else slightly divergent or alternatively substantially convergent.

By virtue of this arrangement, the focusing of the beam 9 leads to greater heating of the area A of the body 2 of the preform 3 which is swept by said focused beam, while the electric power supplied to the lamp 1A may be in no way modified, or may indeed by attenuated. In addition, the area A thus heated preferentially may be of a restricted extent and be heated relatively uniformly over its entire extent.

Furthermore, simple adjustment of the position of the preferentially heated area A on the body 2 may be envisaged by providing means for moving the focusing element 8 parallel to the axis of the preform (double arrow 10). Likewise, means for moving the focusing element 8 transversely to the axis of the preform (double arrow 11), in order to bring it closer to or further from the lamp 1A, thereby making it possible to intercept a greater or smaller fraction of the radiation 4 emitted by the lamp 1A, and therefore to adjust, within certain limits, the power for heating the area A.

By comparing the beams 7A shown diagrammatically respectively in FIGS. 1 and 2, it may furthermore be observed that the lower part of the beam 7A in FIG. 1, which diverged toward the neck 5 of the preform 3 is now reflected toward the area A of the body 2 because of the focusing and no longer reaches the neck 5. At the same time, the mask 6 stops the downwardly divergent and unfocused part of the beam 4 which emanates from the lamp 1A. In total, the neck 5 of the preform 3 no longer receives radiation coming from the lamp 1A.

With regard to the beam 7B coming from the lamp 1B, the thermal impact on the neck 5 of said lamp 1B may be appreciably reduced by providing a suitable mask, placed between the lamps 1B and 1A, which would occult at least an appreciable fraction thereof. Rather than putting a specific mask in place, which would complicate the structure of the furnace, it is possible to profit from the presence of the focusing element 8 associated with the lamp 1A which, as may be clearly seen in FIG. 2, is placed in the path of an appreciable fraction of the beam 7B emanating from the lamp 1B in the direction of the neck 5. Given the position of the focusing element 8 and the relative inclinations of its faces and the rays emanating from the lamp 1B, the lower fraction of said beam 7B is stopped by the focusing element 8 or, for a small part of this fraction, is refracted into the beam 9. Thus, only the upper fringe of the beam 7B passes above the focusing element 8 and is superimposed obliquely with the beam 9 focused onto the area A.

Thus, by virtue of the focusing element 8 put into place in accordance with the invention, the effectiveness of the heating of the area A which has to be heated preferentially is not only increased but the stray heating of the neck 5, which is adjacent to said area A and which must not be heated preferentially, is very appreciably reduced. This double result is obtained by virtue of the presence of a single additional component and the double, focusing and screen, function attributed to this component makes it possible to treat two adjacent areas in respectively opposed manners (extra heating in the case of one area and no heating in the case of the other). Furthermore, these remarkable results are obtained without modifying the heating lamp 1A and its electrical supply, or conversely, for a given heating power for the area A, it is possible to reduce the electric power supplied to the lamp 1A.

Figure 3:
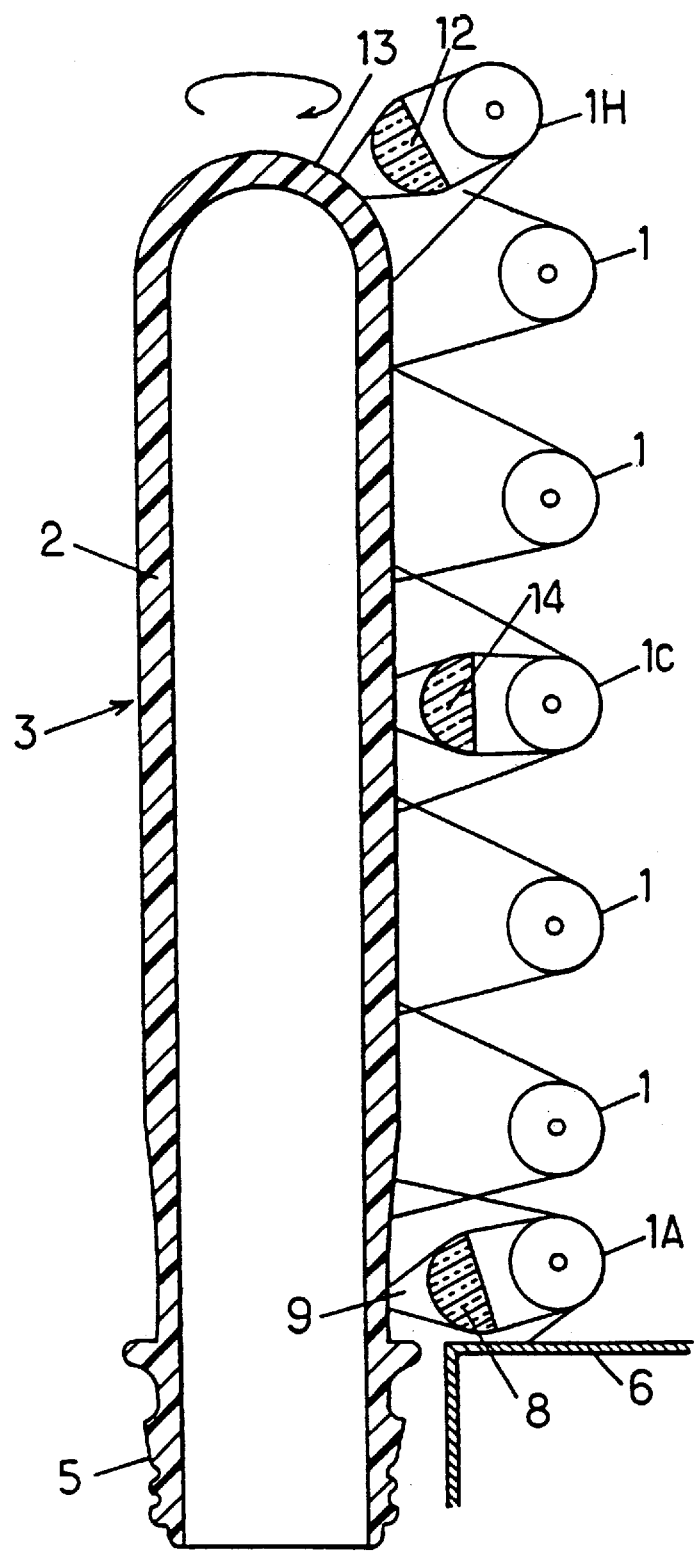
FIG. 3 is a diagram illustrating, in a simplified manner, a preferred variant of an application of the heating method in FIG. 2.

However, it will be noted that the essential role of the additional element 8 is to focus the infrared radiation emitted by the adjacent lamp onto an area opposite the body 2 of the preform 3. That being so, this function alone may be provided. FIG. 3 thus shows another example of an application of a focusing element 12 whose sole function here is to focus the radiation emitted by the upper lamp 1H onto the bottom area 13 of the preform 3. FIG. 3 also shows the implementation of a focusing element 14 whose function is to focus the radiation emitted by a lamp 1C, these being placed opposite a desired position (necking area) on the body of the preform. Such an arrangement allows point-like heating of the appropriate areas of the body so as to facilitate correct stretching of said areas (spherical cap of the bottom, or any other area of the body) of the preforms during the operation of blow molding or of stretch-blow molding, while at the same time better controlling, with regard to the bottom, the diameter of a cooler disc in the center of the bottom, at the point of injection of the preform, or, with regard to any other area of the body, the desired stretching.

Needless to say, and as moreover results already from the foregoing, the invention is in no way limited to those of its methods of application and of its embodiments which have been more especially envisaged; on the contrary, it embraces all the variants thereof.

We claim:

1. Method for selectively heating a preform (3), for the manufacture of a container made of a thermoplastic, by at least one subsequent step of blow molding or of stretch-blow molding of the hot preform, comprising the steps of:

emitting radiation (4) from a first lamp (1A) lying approximately opposite a preferential area (A) of the preform (3);

optically focusing a majority (7A) of the radiation (4) emitted, approximately in the direction of the preform (3), by the lamp (1A) onto said preferential area (A) of the preform, whereby said preferential area (A) receives the majority (7A) of the radiation (4) whereas areas neighboring said preferential area (A) do not receive radiation initially emitted by the lamp toward said neighboring areas.

2. Method according to claim 1, further comprising emitting radiation, including at least one part of radiation (7B), from a second lamp (1B) neighboring said first lamp (1A) in the direction of an area (5) to be preserved from heating in a preferential manner, wherein the area (5) to be preserved from heating is adjacent to the area (A) to be heated preferentially and is opposite the second lamp (1B)

attenuating at least part of said at least one part of the radiation (7B), whereby the area (A) to be heated preferentially receives the focused radiation coming from the first lamp (1A) and at least one part of the attenuated radiation coming from the second lamp (1B), whereas said area (5) to be preserved from heating in a preferential manner receives neither the radiation from the first lamp, which has been focused onto the area (A) to be heated preferentially, nor the at least one part of the attenuated radiation from the second lamp (1B).

3. Method according to claim 2, further comprising occulting at least part of the radiation, from the second lamp (1B), which has been emitted approximately in the direction of said area (5) which must not be heated preferentially.

4. Method according to claim 2, further comprising preferentially heating said area (A) of the preform (3), wherein said area (A) is intended to from the shoulder of the container, and protecting the neck (5) of the preform, which is immediately adjacent to said area (A) to be heated preferentially and opposite which no radiation lamp is placed, from the heating in a preferential manner.

5. Method according to claim 1, further comprising preferentially heating a bottom (1B) of the preform.

6. Method according to claim 1, further comprising preferentially heating a part of the body of the preform which lies between a bottom (1B) and a neck (5) of said preform.

7. Device for selectively heating a preform (3) for the manufacture of a container made of a thermoplastic, by at least one subsequent step of blow molding or of stretch-blow molding of the hot preform, said device including:

at least one radiation lamp (1A) emitting heating radiation in the direction of the preform (3);

an optical focusing element 8 interposed between the lamp (1A) and the preform (3) such that said optical focusing element receives a majority (7A) of the radiation (4) emitted by the lamp (1A) in the direction of the preform (3), and focuses said majority (7A) of the radiation onto a preferential area (A) of the preform, wherein said preferential area (A) lies opposite to said lamp (1A).

8. Device according to claim 7, including a second radiation lamp characterized in that the optical focusing element (8) is placed so as to attenuate at least a majority of the radiation (7B) coming from said second lamp (1B) directed toward a second area (5) of the preform, wherein said second area (5) is immediately adjacent to said preferential area (A) to be heated preferentially, and wherein said second area (5) must not be heated preferentially.

9. Device according to claim 8, characterized in that the optical focusing elements (8) is designed to occult the majority of said radiation (7B) from the second lamp (1B) directed toward said second area (5).

10. Device according to claim 7, further comprising a first movement means for moving (10) the optical focusing element (8) parallel to a longitudinal axis of the preform, whereby the area of incidence of the focused radiation on the preform is adjusted.

11. Device according to claim 7, further comprising a second movement means (11) for moving the optical focusing element closer to or further from said radiation lamp to thereby adjust the intensity of the radiation focused onto the preform.

12. Device according to claim 7, wherein the focusing element (8) comprises at least one plano-convex optical element having its convexity turned toward the preform, the axis of the plano-convex element being approximately aligned with a center of the lamp (1A) and a center of the area (A) on the preform which is to be heated preferentially.

13. Device according to claim 12, wherein the radiation lamp (1A) in the form of a strip, and the plano-convex element is a plano-convex optical strip having approximately the same length as the radiation lamp.

14. Device according to claim 8, wherein the focusing element (8) is placed so that the area (A) of the preform (3) is heated preferentially and so that the neck (5) of the preform is not heated preferentially.

15. Device according to claim 7, further comprising a second focusing element (12) placed near a bottom (1B) of the preform (3) so that the bottom (1B) of the preform (3) is heated preferentially.

16. Device according to claim 7, further comprising a third focusing element (14) placed so that a desired area of the body of the preform (3) is heated preferentially wherein the desired area is between a bottom (1B) and a neck (5) of the preform 3.

17. Method according to claim 2, further comprising using an optical element (8) to perform said step of focusing and said step of attenuating.

18. Method according to claim 17, further comprising moving said optical element in front of said first lamp (1A) in a direction approximately parallel (10) to the preform (3) in order to set up the area of incidence of the focused radiation (9).

19. Method according to claim 17, further comprising moving said optical element (8) in a direction transverse (11) to the preform so that said optical element is either closer to or further from said first lamp (1A) to thereby set the intensity of the focused radiation (9) which reaches the preform.

* * * * *

UNITED STATES PATENT AND TRADEMARK OFFICE
CERTIFICATE OF CORRECTION

PATENT NO. : 5,920,677
DATED : July 06, 1999
INVENTOR(S) : Gerard Emmer, Alain Evrard It is certified that error appears in the above-identified patent and that said Letters Patent is hereby corrected as shown below:

```
On the title page, item [22] should read --PCT Filed: Apr. 10, 1996 --
```

Signed and Sealed this

Fourth Day of April, 2000

*Attest:*

Q. TODD DICKINSON

*Attesting Officer*          *Director of Patents and Trademarks*